United States Patent Office
3,452,025
Patented June 24, 1969

3,452,025
1-AMINO-1,3,4,6,7,11b-HEXAHYDRO-2H-BENZO[a]
QUINOLIZINES
Holger V. Hansen, Morris Plains, and Robert I. Meltzer, Rockaway, N.J., assignors to Warner-Lambert Pharmaceutical Company, Morris Plains, N.J., a corporation of Delaware
No Drawing. Filed Aug. 12, 1966, Ser. No. 572,003
Int. Cl. C07d 33/50
U.S. Cl. 260—288    5 Claims

ABSTRACT OF THE DISCLOSURE

1 - amino - 1,3,4,6,7,11b - hexahydro - 2H - benzo[a]quinolizines useful as CNS and respiratory stimulants are disclosed.

The present invention relates to 1-amino derivatives of hexahydrobenzo[a]quinolizine having the formula:

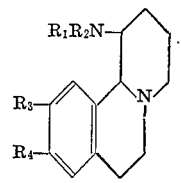

I wherein $R_1$ and $R_2$ may be the same or different, each representing hydrogen, lower alkyl, aralkyl or acyl and $R_3$ and $R_4$, which may also be the same or different, each represent hydrogen, lower alkoxy, aralkoxy or $R_3$ and $R_4$, taken together, represent methylenedioxy.

In the above definitions for $R_1$, $R_2$, $R_3$, and $R_4$ "lower alkyl" is meant to include groups containing from 1 to 6 carbon atoms such as methyl, ethyl, propyl, isopropyl and the like. The lower alkyl portion of "lower alkoxy" is meant to include also groups containing from 1 to 6 carbon atoms such as methoxy, ethoxy, and the like. The term "aralkyl" is meant to include phenyl lower alkyl in which lower alkyl has the same meaning as defined above, such as benzyl and the like; the term "acyl" is the residue derived from a carboxylic acid and "aralkoxy" is meant to include phenyl lower alkoxy in which lower alkoxy has the same meaning as defined.

The present invention also includes within its scope the non-toxic pharmaceutically acceptable acid addition salts of the above novel benzo[a]quinolizines as well as various pharmaceutical dosage forms containing the same as active ingredients.

The novel compounds of this invention as well as their acid addition salts are useful as mild central nervous system and respiratory stimulants. They are useful in respiratory failure and to this they may be administered parenterally at a dose of from about 1 to 100 mg. to produce respiratory stimulation. They are to be mixed with glucose solution and given as an intravenous drip. This dosage regimen may be adjusted according to individual requirements.

The compounds of this invention are produced by treating a compound of the formula:

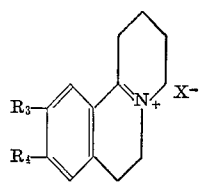

II wherein $R_3$ and $R_4$ are as previously defined and X is an inorganic anion such as a sulfate, a halide, a perchlorate and the like to the corresponding tertiary base of the formula:

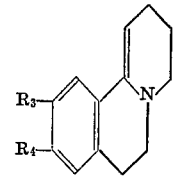

III in accordance with the procedure described by Ban et al., Chem. Pharm. Bull., 8, 653 (1960). The starting Compound II is prepared in accordance with the description by Child et al., J. Chem. Soc., 1931, 36. The intermediate Compound III thus obtained is then treated with nitrosyl chloride in an inert solvent of low freezing point such as toluene at low temperature such as from —75 to 0° C. to give a 3,4,6,7 - tetrahydro-1-nitroso-2H-benzo[a]quinolizine hydrochloride having the formula:

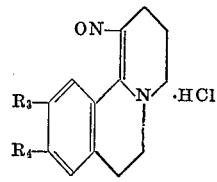

IV or its oximino tautomer having the formula:

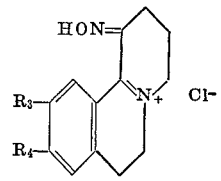

V

Reduction of either of these intermediates IV or V with gaseous hydrogen in the presence of a platinum catalyst yields the novel benzo[a]quinolizines of this invention.

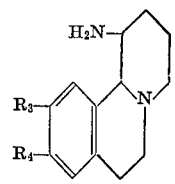

VI

Compound VI may also be obtained by the following alternate route. This is accomplished by treating Compound IV or V with a complex metal hydride such as potassium or sodium borohydride to yield a compound of the structure:

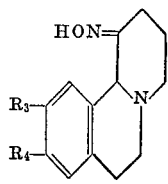

VII

Compound VII may then be further reduced e.g. with gaseous hydrogen in the presence of a noble metal catalyst, e.g. platinum, to Compound VI.

Compound VI may then be converted to the related secondary or tertiary amines by known alkylation procedures such as treatment with an acylating agent, followed by reduction of the resulting acylamino derivative with a reducing agent such as lithium aluminum hydride, or treatment with a formaldehyde-formic acid mixture.

The salts of the novel 1-amino benzo[a]quinolizines of this invention are readily prepared by the usual methods, such as, for example, the reaction of a stoichiometrically equivalent amount of the base and the desired acid in an inert common solvent. Examples of acids which are suitable for the preparation of acid addition salts of the amine base of this invention are inorganic acids, such as, for example, hydrochloric, hydrobromic, nitric, sulfuric, phosphoric, and the like acids, and organic acids, such as, for example, benzoic, acetic, salicylic, maleic, tartaric, citric and the like acids. The preferred salts are those which are pharmaceutically acceptable, that is, they are acid addition salts which are no more toxic than the bases from which they are prepared and which possess the necessary physical properties that render them suitable for incorporation into dosage forms in combination with the desired pharmaceutical carriers.

The following examples are included in order further to illustrate and not to limit the scope of the invention. All temperatures are given in degrees centigrade.

EXAMPLE 1

9,10 - dimethoxy - 1 - nitroso-3,4,6,7-tetrahydro-2H-benzo[a]quinolizine hydrochloride.—An aqueous solution of 25 g. (0.0767 mole) of the benzo[a]quinolizinium salt I (Childs and Pyman, J. Chem. Soc., 1931, 36) is treated with excess 10 M potassium hydroxide and the resulting anhydro base extracted into about 500 ml. toluene. The toluene solution is dried (potassium carbonate) and filtered, then chilled in an acetone-Dry Ice bath to —80°. A solution of 5.5 g. (0.084 mole) of nitrosyl chloride in 150 ml. of toluene is then added, with stirring, during 90 min., maintaining the reaction mixture at —80°. After stirring for a further 90 min., the solution is allowed to warm to about 0° and filtered. The crude solid is recrystallized directly from 1:1 methanol-ether, furnishing the nitrosated product (II), as bright yellow crystals, M.P. 198–200° d. Further recrystallization from methanol-ether gives an analytical sample of M.P. 198–200° d.;

$\lambda_{max.}^{EtOH}$ m$\mu$ ($\epsilon$) 262 (14,800), 334 (7200), 377 (8210);

$\lambda_{max.}^{0.1N\ HCl}$ m$\mu$ ($\epsilon$) 261 (15,600), 326 (6800), 377 (7100);

$\lambda_{max.}^{0.1N\ NaOH}$ m$\mu$ ($\epsilon$) 231 (10,800), 258 (11,800), 339 (17,290); $\nu^{Nujol}$ 2700 (NH+), 1680 (C=N weak, broad) cm.$^{-1}$.

Analysis.—Calcd. for $C_{15}H_{18}N_2O_3 \cdot HCl$: C, 57.97; H, 6.16; N, 9.01; Cl, 11.41. Found: C, 58.26; H, 6.26; N, 9.01; Cl, 11.15, 11.29.

EXAMPLE 2

9,10 - dimethoxy - 1-oximino-1,3,4,6,7,11b-hexahydro-2H-benzo[a]quinolizine. Method A. Borohydride Reduction.—To a stirred solution of 9.5 g. (0.0306 mole) of the nitrosation product (I) in 100 ml. of water and 25 ml. of ethanol is added a solution of 2 g. (0.037 mole) of potassium borohydride in 25 ml. water, the yellow color of I slowly disappears during this addition. After stirring for 2 hr., 200 ml. of water is added and the resulting mixture chilled and filtered, giving the oxime (II) as an off-white solid, M.P. 193–196° d. A colorless analytical sample is obtained by two recrystallizations from acetonitrile, M.P. 191–195° d.;

$\lambda_{max.}^{EtOH}$ m$\mu$ ($\epsilon$) 229 sh. (8050), 281 (3580), 286 (3600), 290 sh. (3140);

$\lambda_{max.}^{CHCl_3}$ 3600, 3270 (OH), 1660 (weak C=N) cm.$^{-1}$ $\lambda_{max.}^{Nujol}$ 3200, 2700 (OH N).

Analysis.—Calcd. for $C_{15}H_{20}N_2O_3$: C, 65.19; H, 7.30; N, 10.14. Found: C, 65.49; H, 7.35; N, 10.38.

The hydrobromide salt is prepared by passing excess hydrogen bromide into a slurry of 6 g. of the crude oxime (II) in 50 ml. of absolute ethanol. The resulting mixture is heated and diluted with more absolute ethanol to effect solution. Addition of ether to the warm solution gives the salt, M.P. 185–189°. Two recrystallizations from methanol-ether gives colorless, analytically pure material, M.P. 190–192°;

$\lambda_{max.}^{EtOH}$ m$\mu$ ($\epsilon$) 234 (8010), 281 (3440), 284 (3500), 289 sh. (3120); $\gamma^{Nujol}$ 3200 (OH), 2550, 2650, 2700 (NH+) cm.$^{-1}$.

Analysis.—Calcd. for $C_{15}H_{20}N_2O_3 \cdot HBr$: C, 50.43; H, 5.92; N, 7.84; Br, 22.37. Found: C, 50.19; H, 6.02; N, 8.13; Br, 22.59, 22.36.

Method B. Catalytic Reduction.—A solution of 5 g. (0.016 mole) of the nitrosation product (I) in 300 ml. of acetic acid is hydrogenated at about 20 to 30° C. in the presence of 0.15 g. of platinum oxide catalyst at an initial pressure of 3 atm. of hydrogen. After 90 min. the uptake of hydrogen has stopped. The reaction mixture is filtered and evaporated. The residue is dissolved in about 100 ml. of water and made basic (pH 8) with alkali. On cooling, the oxime (II) separates. Recrystallization from acetonitrile then furnishes the pure oxime (II), M.P. 192–194° d., identical with the material prepared by method A.

EXAMPLE 3

1 - amino - 9,10 - dimethoxy-1,3,4,6,7,11b-hexahydro-2H-benzo[a]quinolizine dihydrochloride monohydrate.—To a solution of 12.5 g. (0.0403 mole) of the nitrosation product (I) in 300 ml. of acetic acid is added 0.5 g. of platinum oxide and the resulting mixture is hydrogenated for a total of 6 hr. at 3–3.5 atmosphere. A second portion of 0.2 g. of platinum oxide is added after 4 hr. when reduction has almost stopped due to precipitation of the product on the catalyst. An overall pressure drop of 9.8 p.s.i. gauge is observed. When reduction is complete, the reaction mixture is filtered, the catalyst thoroughly washed with warm water and the combined solvents are treated with 10 ml. of 6 N hydrochloric acid and evaporated. The residue is triturated with ethyl acetate and filtered, giving the crude salt of I. A colorless analytical sample is obtained by recrystallization from aqueous isopropyl alcohol.

This has M.P. 283–284° d. and retained one mole of water of crystallization after drying at 80° in high vacuum;

$\lambda_{max.}^{EtOH}$ m$\mu$ ($\epsilon$) 224 sh. (8000), 281–286 (3600) and 290 sh. (3200); $\gamma^{Nujol}$ 3500, 5320, 3200, (NH$_3^+$ and H$_2$O), 2850, 2800 and 2750 (NH$^+$) cm.$^{-1}$.

*Analysis.* — Calcd. for $C_{15}T_{22}N_2O_2 \cdot 2HCl \cdot H_2O$: C, 51.29; H, 7.46; N, 7.98; Cl, 20.19. Found: C, 51.21; H, 7.49; N, 815; Cl, 20.01, 19.91.

The free base is obtained as a solid with M.P. 113–119° by treatment of an aqueous solution of the dihydrochloride with excess 10 M potassium hydroxide and filtration. Two recrystallizations from Skellysolve B furnishes an analytical sample, M.P. 121–123°. This material becomes tan on standing for several days;

$\lambda_{max.}^{EtOH}$ ($\epsilon$) m$\mu$ 222 sh. (8800), 282 (3800), 286 (3800) and 290 sh. (3280); $\gamma_{CHCl_3}$ 2730, 2800 (Bohlmann), 3200 (broad, NH$_2$), 1590 cm.$^{-1}$. (NH$_2$).

The N-acetyl derivative of the 1-amino compound, prepared by treatment of the free base with acetic anhydride in pyridine and recrystallized from Skelly B, has M.P. 119–120°;

$\lambda_{max.}^{EtOH}$ m$\mu$ ($\epsilon$) 224 sh. (8800), 280 (3760), 285 (3780), 279 sh. (3320);

$\lambda_{max.}^{Nujol}$ 3380 (NH) 2720 (Bohlmann), 1640 (C=O) cm.$^{-1}$.

EXAMPLE 4

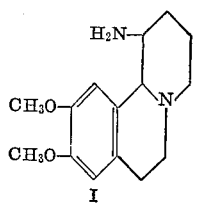 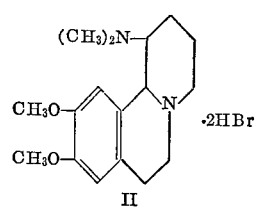

I  II 9,10 - dimethoxy - 1 - dimethylamino - 1,3,4,6,7,11b-hexahydro-2H-benzo-[a]quinolizine dihydrobromide.—A solution of 4 g. (0.0174 mole) of the primary amine I in 20 ml. of 37% aqueous formaldehyde and 10 ml. of 98% formic acid is refluxed for 20 hr., cooled, the solvent removed in vacuum and the residue dissolved in water. The aqueous solution is made strongly basic with 10 M potassium hydroxide and the resulting oil is extracted into ether. After drying with potassium carbonate, the ether solution is treated with excess hydrogen bromide and filtered, giving the dihydrobromide (II) as a yellow powder, M.P. 258–261° d. An analytical sample of II is obtained after two recrystallizations from water-isopropyl alcohol as pale yellow needles, M.P. 262–264° d.;

$\lambda_{max.}^{EtOH}$ 227 m$\mu$ ($\epsilon$) (8440), 283 (4040), 288 (4060) and 291 sh. (3500); $\gamma^{Nujol}$ 2600 (NH$^+$) cm.$^{-1}$.

We claim:
1. A compound of the formula:

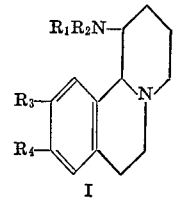

I wherein R$_1$ and R$_2$ may be the same or different and each represents hydrogen, lower alkyl, phenyl lower alkyl or acyl of a carboxylic acid and R$_3$ and R$_4$ each represents hydrogen, lower alkoxy, phenyl lower alkoxy, or R$_3$ and R$_4$ taken together represent methylenedioxy and its acid addition salts.

2. 9,10 - dimethoxy - 1 - oximino-1,3,4,6,7-11b-hexahydro-2H-benzo[a]quinolizine.

3. 9,10 - dimethoxy - 1 - nitroso-3,4,6,7-tetrahydro-2H-benzo[a]quinolizine or the oxime tautomer thereof.

4. 1 - amino - 9,10 - dimethoxy - 1,3,4,6,7,11b-hexahydro-2H-benzo[a]quinolizine.

5. 9,10 - dimethoxy - 1 - dimethylamino-1,3,4,6,7,11b-hexahydro-2H-benzo[a]quinolizine.

References Cited

UNITED STATES PATENTS

| | | | |
|---|---|---|---|
| 3,105,079 | 9/1963 | Tretter | 260—286 X |
| 3,132,147 | 5/1964 | Schopf et al. | 260—288 |

OTHER REFERENCES

Saito et al. Chem. Pharm. Bull. (Japan) vol. 13, pp. 786–96 (1965). Abstracted in Chem. Abstr. vol. 63, col. 11634.

ALEX MAZEL, *Primary Examiner.*

D. G. DAVIS, *Assistant Examiner.*

U.S. Cl. X.R.

260—286, 287, 999